April 12, 1960
J. R. MORRIS ET AL
2,932,087
TEMPLATE CUTTING APPARATUS FOR BENT
SHEETS OF GLASS OR THE LIKE
Filed May 10, 1954
3 Sheets-Sheet 1
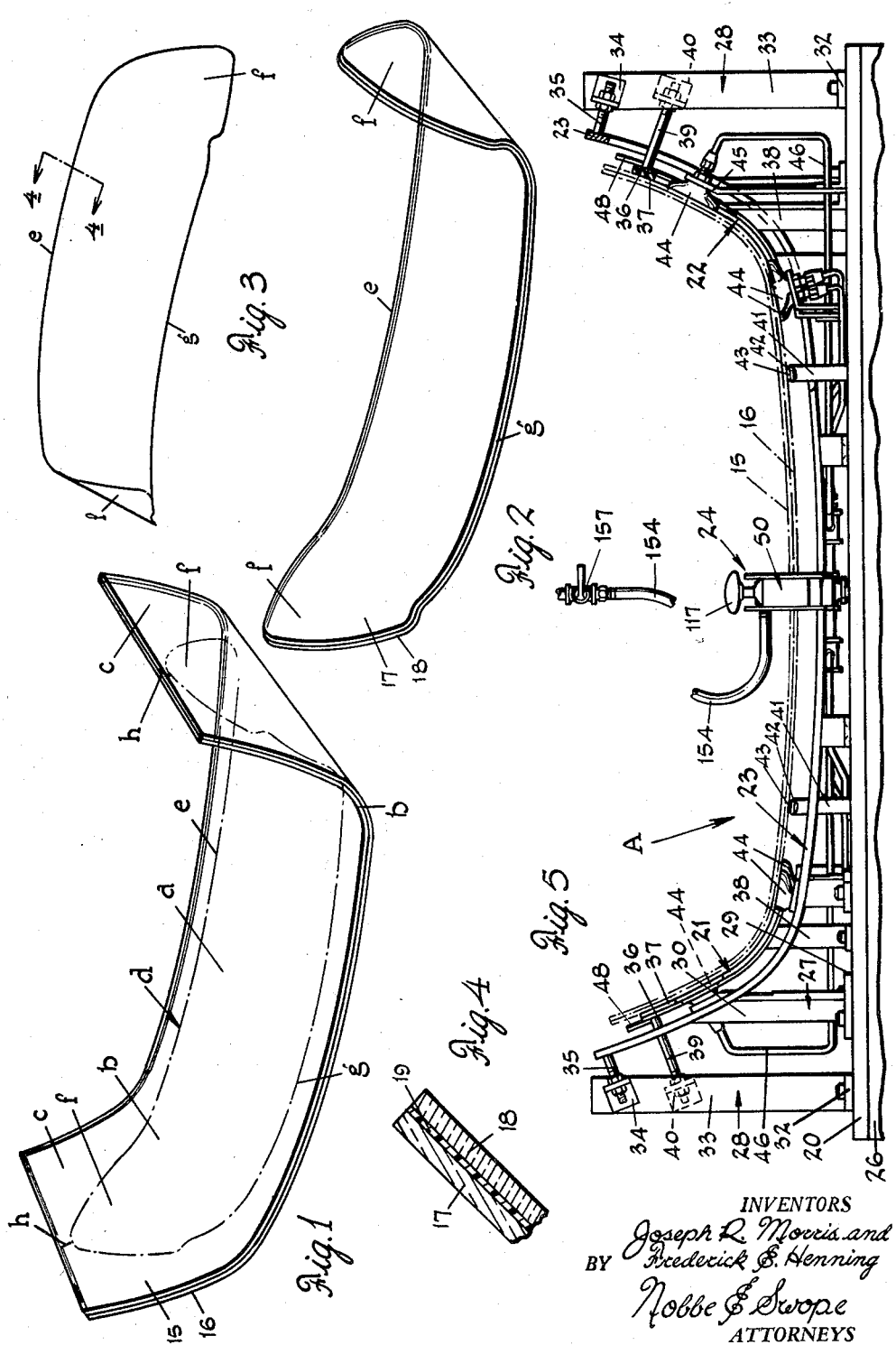
INVENTORS
Joseph R. Morris and
BY Frederick E. Henning
Nobbe & Swope
ATTORNEYS

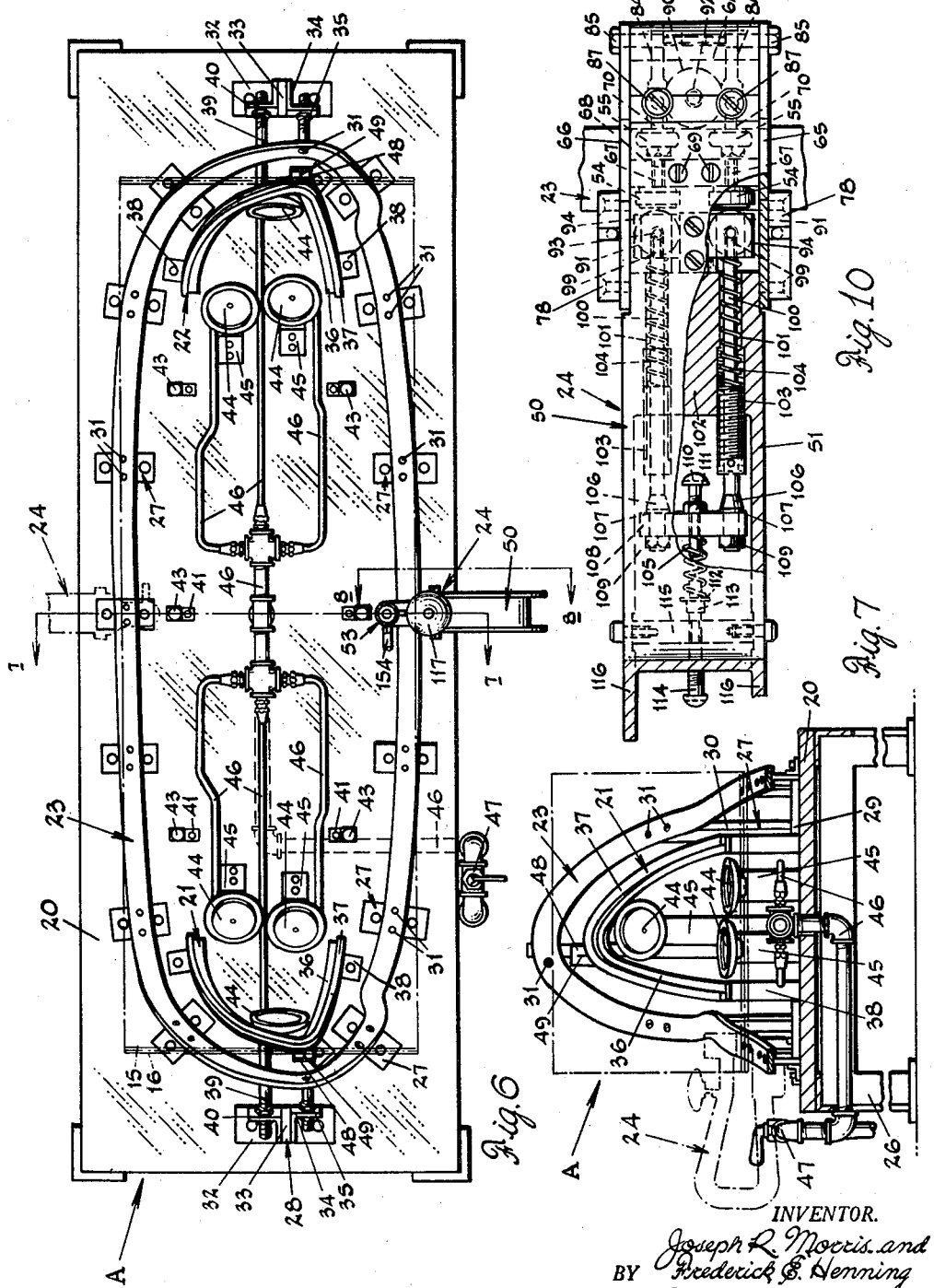

April 12, 1960
J. R. MORRIS ET AL
2,932,087
TEMPLATE CUTTING APPARATUS FOR BENT
SHEETS OF GLASS OR THE LIKE
Filed May 10, 1954
3 Sheets-Sheet 3
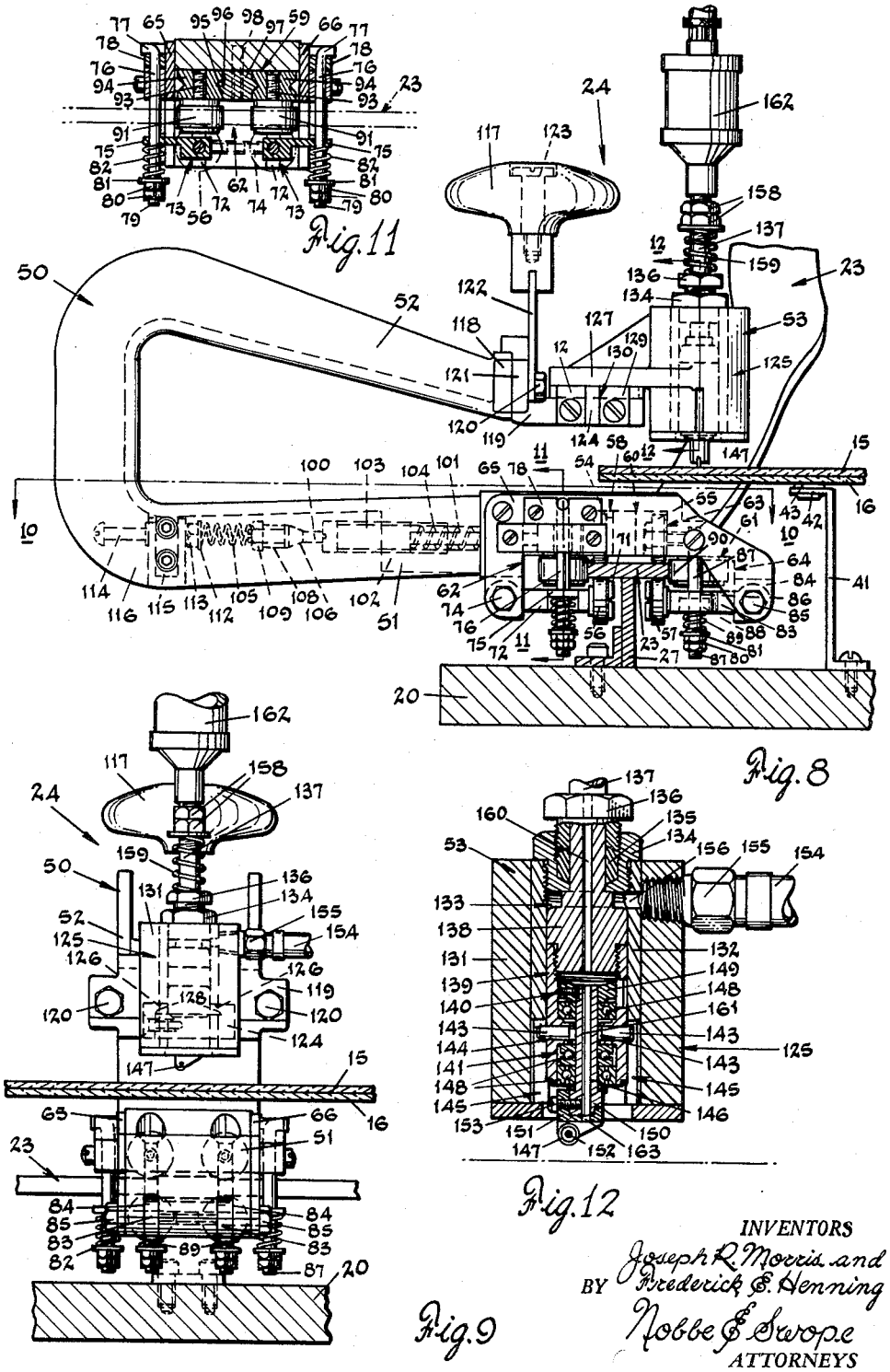
INVENTORS
Joseph R. Morris and
BY Frederick E. Henning
Nobbe & Swope
ATTORNEYS United States Patent Office 2,932,087
Patented Apr. 12, 1960

2,932,087

TEMPLATE CUTTING APPARATUS FOR BENT SHEETS OF GLASS OR THE LIKE

Joseph R. Morris and Frederick E. Henning, Toledo, Ohio, assignors to Libbey-Owens-Ford Glass Company, Toledo, Ohio, a corporation of Ohio Application May 10, 1954, Serial No. 428,778

1 Claim. (Cl. 33—27)

This invention relates broadly to the cutting of sheets or plates of glass or like materials. More particularly, it is concerned with an improved template cutting apparatus upon which pairs of block size sheets of glass, which have been previously bent in nested conformity to a predetermined curvature, can be accurately pattern-cut in exact duplication of one another.

With the modern trend in automobile body design, which is endeavoring to afford a fuller or more complete view of traffic and scenery at the sides as well as forwardly of the vehicle, the visual area has been increased by shaping the automobile windshields so as to span not only the entire front of the car body and rearwardly through the forward corners but also to extend further into the side areas of the car. This type of windshield, which is becoming increasingly popular, is of the one-piece variety, and has been identified as a "panoramic" or "wrap-around" windshield. Such windshields are necessarily large and of complicated bent curvature since in their manufacture they are both shaped to the contour of the entire forward area of the car body and also cut to a predetermined pattern approximating the full outline of the opening in such forward area.

Moreover, in accordance with the ASA code, automobile windshields must be formed of laminated safety glass which is made up of two sheets of glass laminated together, with an interposed layer of nonbrittle thermoplastic material, under heat and pressure, to form a composite, transparent unit. Consequently, before the laminating step, the glass sheets must be bent; preferably by placing the same in pairs on suitable molds and conveying the molds through the controlled zones of a heated furnace. When removed from the molds at the end of the furnace, the sheets of each bent pair will be found to nest or conform in curvature to one another throughout their length, and this precise conformity of curvature throughout the sheet area must be maintained until completion of the laminating step to insure that there will be no "voids" or open areas between the layers of the composited unit and that, especially along the marginal edges, there will be satisfactory registration.

In the case of one-piece windshields of the deeply bent or "wrap-around" variety, it has been found advantageous to perform the bending of the glass sheets while they are still in a rectangular blank or block size, and to subsequently cut a section of the desired windshield pattern from the bent block size sheet. In the copending application of Harold M. Alexander et al., Serial No. 416,176, there is described a procedure for positively maintaining registration of such bent, block size sheets until they have been cut or scored along a predetermined template outline, and it is the primary purpose of the present invention to provide an improved template cutting apparatus by means of which a pair of accurately cut sections can be removed from blanks of glass which have been bent and maintained in nested conformity with one another.

Another object is to provide a cutting apparatus of this character upon which a blank size of bent glass or like materials can be individually accurately cut to a predetermined outline while it is maintained in nested conformity with one another.

Another object is to provide an improved template cutting apparatus for bent sheets of glass or like materials upon which said sheets can be rapidly secured in registry with an outline template and then be sequentially cut so as to produce identical sections from the nested areas of the bent sheets.

A further object is to provide, in a template cutting apparatus for bent sheets of glass, means for locating and securing said sheets from movement with reference to a template of predetermined curvature and outline while cut lines are being successively made in substantially identical areas of each of the similarly bent sheets.

Other objects and advantages of the invention will become more apparent during the course of the following description when taken in connection with the accompanying drawings.

In the drawings wherein like numerals are employed to designate like parts throughout the same:

Fig. 1 is a perspective view of two rectangular, block size sheets of glass that have been bent as a pair;

Fig. 2 is a perspective view of superimposed sections that have been pattern-cut from the rectangular sheets shown in Fig. 1;

Fig. 3 is a perspective view of a laminated windshield having the outline of the pattern-cut sections shown in Fig. 2;

Fig. 4 is a fragmentary sectional view taken substantially along the line 4—4 of Fig. 3;

Fig. 5 is a side elevation of a preferred form of template cutting apparatus constructed in accordance with this invention;

Fig. 6 is a top or plan view of the template cutting apparatus;

Fig. 7 is a transverse, vertical sectional view of the cutting apparatus taken on line 7—7 of Fig. 6;

Fig. 8 is a side elevation of a cutting unit associated with the apparatus and as seen along the line 8—8 of Fig. 6;

Fig. 9 is an end view of the cutting unit of Fig. 8;

Fig. 10 is a horizontal, cross-sectional detail view taken along line 10—10 of Fig. 8;

Fig. 11 is a vertical, cross-sectional detail view taken along line 11—11 of Fig. 8; and Fig. 12 is a vertical, cross-sectional detail view taken along line 12—12 of Fig. 8.

In Figs. 1 and 2 of the drawings, there is shown a pair of rectangular sheets of glass 15 and 16 which are representative of typical block-size sheets that have been bent in pairs to substantially conform to the forward area of an automobile body. Thus, the central areas a of the sheets correspond to the curvature, in a substantially horizontal plane, of the transverse or forward area of the body; the sharply bent areas b to the corners of the body and the ends c to the side areas of the car body immediately adjoining said corners. From these bent sheets, there is to be removed, as indicated by the broken line d, central areas or sections that will be cut to an outline to correspond along one side, as at e, to the upper contour of the opening in the car body; at f to similarly correspond to the side contour of the car and again, along the opposite side, as at g, to the lower contour of the car body where it is shaped from the cowl into the motor hood. The pattern-cut sheets 17 and 18 of Fig. 2, result from the removal of the center sections just described from the blank size sheets 15 and 16, and must exactly register along their perimeter edges and at the same time accurately nest in the curvedly and deeply bent areas a, b and c in order to provide the completed windshield of Fig. 3 in which the inner surfaces of the sheets 17 and 18 have been laminated throughout to a thermoplastic interlayer 19 as shown in Fig. 4.

Referring now more particularly to Figs. 5 to 11 of the drawings, the letter A designates, in its entirety, a cutting apparatus constructed in accordance with this invention and which comprises generally a base 20 upon which glass supports 21 and 22 are mounted, a template 23 also mounted thereon and a cutting unit 24 adapted to traverse the template.

The template 23 which is in the form of an endless track is curved longitudinally, in the vertical plane, to duplicate the required bend already produced in the glass sheets, while in a developed substantially horizontal plan it is shaped to correspond to the predetermined outline to be pattern cut. The cutting unit 24 is adapted to be moved along the template 23 and to score or cut a pattern first into one, and then into the other, of the glass sheets, along a line described by the unit 24 as it traverses the track 23. Since the track or template 23 is shaped to the desired curvature, it will be substantially parallel to the surfaces of the glass sheets so that the cutting unit can at all times present the cutting tool to the surfaces in a perpendicular or normal plane.

The base 20 may be mounted on a suitable framework 26 by means of which the track 23 and glass supports 21 and 22 will be elevated to a convenient working height for an operator normally working upright thereabout. The template 23 is supported above the upper surface of the base 20 by means of brackets 27 and 28. The several brackets 27 arranged along the sides of the track 23, comprise a base 29 and an upright post 30, the base 29 being secured to the base 20 by means of suitable bolts or the like. The track 23 may be mounted on the upper ends of posts by means of screws 31 threaded through the body of the track and into the posts. Preferably said posts are arranged centrally between and with their sides parallel to the sides of the track.

The brackets 28 are located at the opposite ends of the template track 23 or at the apices of the convergently disposed portions of the template corresponding to the end areas of the pattern outline. These brackets have a base 32 suitably bolted to the base 20 and an upright post 33. Near the top of posts 33, there is secured an angle 34 that is arranged thereon so that an inwardly directed leg will carry a rod 35 which will be disposed in a plane normal to the portion of the track to be mounted thereon. The rod 35 has a tapped outer end to receive a screw 31 to secure the track thereagainst.

Nested pairs of bent, rectangular size glass sheets to be cut can be located in operative relation to and above the upper surface of the template track 23 by means of the open supports 21 and 22 each of which comprises a ribbon-like, metallic base 36 and a suitably stiff padding material 37 of felt, sponge rubber or the like. Each support is shaped, as will be seen in Fig. 5, to correspond to the curvature of the bent sheets substantially from the sharply bent areas b through the major area of the end portions c (Fig. 1). In plan the supports are generally V-shaped (Fig. 6) to follow the outline of cut, to approximate the adjoining areas of the track 23 and to provide an open structure. The supports are mounted on the base 20 by means of brackets 38 fixedly mounted on the base 20 and also by rods 39 carried in angles 40 secured to the posts 28. The supports 21 and 22 are arranged so that the surfaces of the padding material 37 will be sufficiently above the plane of the surface of the track 25 to permit free movement of the cutting unit 24 as will be more fully hereinafter described.

Between the ends of the base 20 and the supports 21 and 22, brackets 41 may be secured to the base and equipped on their horizontally disposed upper ends 42 with buttons 43 of rubber or the like to support the middle portion of the glass sheets.

For the purpose of maintaining a glass sheet in fixed position on these supports during cutting, there are arranged within the open areas of each support 21 and 22, a plurality of vacuum or suction cups 44 located within the open areas of the supports 21 and 22 and suitably mounted on brackets 45 with the plane of their upper ends or the rims thereof oriented in the plane of the glass surfaces against which they are intended to become effective. The vacuum cups 44 are connected by suitable piping, indicated at 46, to a means for creating a vacuous condition through a control valve 47.

Upon completion of the bending of the glass sheets and after they are removed from the molds, it is conventional practice to place the nested sheets on a checking template to insure that each of the bent pairs of sheets will conform to a predetermined curvature. While on such a checking fixture suitable centrally disposed areas, from which the pattern-cut outline can be obtained, may be indicated with a pencil or crayon, according to legends or other gage marks carried by the checking fixture, as indicated at h in Fig. 1.

In order that the denoted area of the bent sheets will be properly located with reference to the template 23, a gage plate or locator 48 is secured to each of the supports 21 and 22. These locators are aligned with one another so that indicating lines 49 thereon will, upon registration with the indications h on the bent sheets, insure that the desired central areas of the sheets are above the template 23 and also that a chord line through such indications will be aligned with the lines 49.

When the bent sheets 15 and 16 have thus been located on the supports 21 and 22 and the marks h thereon have been brought into registry with the gage lines 49, they may be securely and effectively maintained in that position by operation of the vacuum control valve 47 to reduce the pressure in the piping 46 and cups 44 and cause said cups to grip the adjacent surfaces of the lower glass sheet 16.

It is important that the cutting unit 24, which is employed to successively score a line, such as the line d in Fig. 1, into each of the sheets of glass 15 and 16 as it traverses the track 23, be so supported upon the track that there will be practically no undesirable swaying motion as the unit is moved from the central portions of the track into and away from the sharply rising end portions thereof. To this end, the cutting unit is constructed to insure movability about the track while, at the same time, restricting it from angular motions in either perpendicular or horizontal planes with respect to the area of the track the cutter unit is then traversing. Thus, generally stated, the cutting unit 24 comprises a C-shaped main frame 50 and is supported at its lower extremity 51 on the track 23 while the other or upper extremity 52 carries a cutter wheel assembly generally designated 53. More particularly, the frame 50 is movably supported on the track 23 by means of pairs of casters or ball-bearing rollers 54 and 55 engaging the upper track surface and is maintained in a normal plane with respect thereto by means of pairs of similar rollers 56 and 57 flexibly held against the lower surface of the track. Preferably legs of the C-shape main frame 50 are sufficiently elongated to allow the frame to freely pass around the corners of the rectangular glass sheets as the cutting unit traverses the upwardly rising end areas of the template 23.

The pairs of rollers 54, 55, 56 and 57 are contained within a chamber 58, formed in the lower extremity 51 of the frame, and having horizontally disposed walls 59, 60 and 61 disposed at different elevations with respect to each other, an inner vertically disposed wall 62, a central vertically disposed wall 63 between the horizontal walls 60 and 61 and an outer vertically disposed wall 64. Preferably the opposite ends of the chamber 58 are substantially closed by especially notched plates 65 and 66. The rollers 54 are supported on shoulder screws 67 threaded into a transversely located bar 68 that is affixed to the horizontally disposed wall 60 by means of screws 69 or the like (Fig. 10). The pair of rollers 55 also on the upper surface of the track 23 are journaled on shoulder screws 70 threaded into the vertical wall 63. The peripheries of the rollers 55 are spherical which permits the rollers, being on the inner margin of the track to maintain a constant rolling point contact with track as the rollers, or the unit 24 bodily is moved therealong. The pairs of rollers 54 and 55 are thus adapted to support the frame 50 of the unit.

On the other hand, the pairs of rollers 56 and 57, in being maintained in rolling contact with the under surface of the track, operate to maintain the pairs of rollers 54 and 55 in contact on the upper surface. For this purpose, the pair of ball bearing rollers 56 are journaled on shoulder screws 71 that are threaded into the ends of arms 72. The opposite end of each arm 72 is received in a notch 73 in wall 62 (Fig. 11) and pivotally supported therein by means of a bolt 74 transversely threaded into the same wall. Each arm 72 has an outwardly directed flange 75 through the end of which a rod 76 is passed. The rods 76 are provided at their upper ends with hook 77 which end is received in a notched block 78 suitably affixed to the outer surfaces of the plates 65 and 66. Each rod 76 is provided at its lower end with a threaded portion 79 for receiving nuts 80 that adjustably support a washer 81 and vary the expandability of springs 82 interposed on rods 76 between the washers 81 and flanges 75. By adjusting the position of nuts 80 along the threaded ends 79 of rods 76, the force by which the arms 72 urge their associated rollers 56 against the lower surface of the track 23 may be modified.

The pair of rollers 57 are similarly journaled on the ends of arms 83 received in notches 84 (Fig. 9) in the vertical wall 64 and pivotally carried by bolts 85 threaded therein (Fig. 9). In this instance, however, the bars 83 are provided with centrally disposed apertures 86 for receiving the screws 87 and a cavity 88 for the upper end of the associated spring 89. As above set forth, the springs 89, as in the case of springs 82, are adjusted by means of nuts 80 threaded on to the lowermost ends of screws 87 and supporting the adjacent end of springs 89 by means of washer 81. The springs 82 and 89 are relatively "stiff" in flexing characteristics with the result that the associated rollers 56 and 57 will at all times be positively maintained in rolling contact with the track and consequently the opposed pairs of rollers in a like manner be maintained in rolling contact therewith. This permits the unit to traverse particularly the sharply upwardly curving areas of the track without loss of traction or swaying motion in a vertical plane relative to the track.

While the unit 24 is thus supported for movement along the track 23, it is simultaneously guided thereabout by means of a ball bearing roller 90 in rolling engagement with the inner edge of the track and a pair of similar rollers 91 acting in opposition on the outer edge thereof. As best seen in Figs. 8, 10 and 11, the roller 90 is substantially fixedly journaled on a vertically disposed shoulder screw 92 threaded into the horizontal wall portion 61 of chamber 58. The rollers 91, on the other hand, are arranged at equally spaced points on either side of the axial line of roller 90 and are mounted for movement in planes normal to the edge of the track and toward and away from roller 90. For this purpose, each roller 91 is journaled on a shoulder screw 93 threaded into a block 94. Each block 94 is provided with V-shaped grooves 95 (Fig. 11) in the vertical sides thereof which, on the opposed sides of the blocks 94, are slidably mounted on corresponding shaped ribs 96 of a block 97 which is affixed to the wall 59 of chamber 58 by screws 98. Also each block 94, at right angles to screws 93, receives the threaded end 99 of a rod 100. The rod 100 projects outwardly of the chamber 58 through bores 101 formed in the wall 62 and a boss 102 of frame 50. Each bore has an inner cylindrical portion and an outer tapped portion in which is received a threaded sleeve 103. Between the opposed ends of blocks 94 and sleeves 103, springs 104 are interposed and their expandability may be adjusted by the position of the threaded sleeves 103 in boss 102. The springs 104 are adapted to compensate for individual movements of the blocks 94 in response to the contact of their associated roller against the track edge; however, the combined function of the rollers 90 and 91 is to provide a constant guiding control of the cutting unit along the track. In actual practice, it has been found expedient to reinforce the influence of the springs 104 by means of a third spring 105 that is mounted so as to exert its force equally through the rods 100, against the blocks 94 and thereby afford a commonly distributed pressure against the rollers 91.

For this purpose, the rods 100 are extended through the sleeves 103 and outwardly thereof have enlargements 106 to provide shoulders 107 (Fig. 10). The extreme ends of the rods are adapted to carry a bar 108 and are threaded to receive nuts 109 which secure said bar against shoulders 107. Medially of the rods 100, the bar 108 is tapped to receive a screw 110 having a lock nut 111 thereon. The screw 110 serves to support the adjacent end of spring 105 which at its opposite end bears against a washer 112. The force of spring 105 is adjusted by means of a nut 113 threaded on a screw 114 adjustably threaded into a bar or wall 115 transversely disposed between the flanges or walls 116 of the U-shaped section of frame 50. It will now be apparent that the energy of spring 105 will be effective at the bar 108 to distribute its force equally on the rods 100 and thereby the blocks 94 and rollers 91 carried by the blocks. Also, the blocks will be individually movable along the centrally disposed block 97 and such motion will be flexibly accommodated by the springs 104. In summation, it will further be seen that by means of the collective energies of springs 104 and 105, the rollers 91 will be maintained in rolling contact with one edge of the track 23 while operating to more or less positively pull the roller 90 into rolling contact with the opposite edge of the track.

The cutting unit, as herein shown, is manually propelled or caused to move along and in guided conformity with the track 23 by means of a handle 117 that is mounted on the upper extremity 52 of the frame 50. This extremity is provided with a transverse wall 118 which is adapted to support a sub-frame 119 by bolts 120 inserted through the vertically disposed wall 121 thereof (Fig. 8). On the opposite surface of the wall 121, and also carried by bolts 120, is a plate 122 having a block at its upper end to which the handle 117 is secured by screw 123. The sub-frame 119 is substantially L-shaped and on the horizontally disposed leg 124 a base 125 for the cutter wheel mechanism 53 is mounted. More particularly, the leg 124 is provided with a longitudinally disposed groove having angularly disposed walls 126 between which is received a flange 127 with complementary surfaces 128. The flange 127 is releasably secured from movement by means of blocks 129 that are received in notches 130 afforded in one side of the leg 124 (Figs. 8 and 9).

The body 131 of the base 125 is a substantially vertically disposed cylinder, the flange 127 being directed outwardly therefrom in a horizontal plane, and within the cylindrical body a bore is provided for a sleeve 132 forming the walls of a pressure chamber 133. The upper end of the chamber is threaded to receive a gland member 134 in which is contained suitable packing 135 by a threaded sleeve or plug 136. A plunger member 137 passes through the gland and within the chamber 133 is equipped with cylindrical head 138 that is threadably associated with an especially constructed piston 139 (Fig. 12). The piston, in its upper and lower ends, is provided with annular recesses 140 and 141 respectively and a communicating central bore 142.

The piston is positively restricted from rotary motion within the sleeve 132 by means of pins 143 press-fit into a transverse bore 144 in the piston. The outer end of each pin 143 is slidably received in a vertically disposed slot 145, said slots being formed in diametric opposition in the wall of sleeve 132. The piston 139, however, is adapted to freely reciprocate within the sleeve as the pins 143 slide in their respective slots 145.

A support for the cutting wheel is provided in the form of a swivelly mounted stem or post on which the wheel is supported so as to be able to freely swing or swivel about a vertically disposed axis. This insures that the cutting wheel will instantly conform to the path described by the cutting unit and not bind in even momentary angular relation during its scoring action, and it is urged into the glass surface.

A support post 146 for the cutter wheel 147 is vertically positioned in the bore 142 and is journaled by bearings generally indicated at 148 in the recesses 140 and 141. At its upper end, the post has secured thereto a lock collar 149 by means of which it is supported on the upper bearing 148 and is thus held from outward movement. At its lower end, the post is provided with a bifurcated head 150 between the sides of which a wheel supporting block 151 is carried. As shown in Fig. 12, the block 151 is vertically slotted to receive the wheel 147 and support the shaft 152 therefor in its opposed walls. The shaft 152 also operates to secure the block in the bifurcated head by being carried in the side walls thereof. A screw 153 threaded through the block and into the head secures this fixed relation and may be readily removed to replace the cutter wheel when necessary. Since the shaft 152 is offset from the axis of post 146, a vertical plane through the wheel 147 will be parallel to but offset from a similar plane through said post axis. The cutting wheel is thus free to swivel about the post axis and is enabled to continuously engage the glass surface by its extremely sharp periphery.

The pressure chamber 133 is connected to a source of air under pressure by means of a flexible hose 154 having a conventional end fitting 155 threaded into the body 131 and communicating with said chamber through a port 156 in the wall of sleeve 132. For convenience of operation of the cutting unit during its traversal of the track 23, the hose 154 is connected to suitable valve 157 that may be positioned above the center of the base 20, as shown in Fig. 5. When air is admitted into the chamber 133 by means of a suitable valve, the head 138 of plunger 137 and the piston 139 will be actuated to move downwardly and thereby urge the cutter wheel 147 into scoring engagement with the glass surface.

To instantly lift the cutter wheel and carry the piston upwardly, the plunger 137 above the packing gland 134 is provided with a threaded end on which nuts 158 are received and adjustably positioned according to the requirements of a spring 159. Obviously, upon supplying of air to the chamber 133, the plunger will be actuated downwardly to compress the spring and when the air pressure is closed, the spring acting through the nuts 158 will urge the plunger, the piston and the cutter wheel assembly upwardly. The plunger 137 and stem 146 are also provided with axial bores 160 and 161 and a suitable liquid receptacle 162 is threaded onto the end of the plunger. Such receptacles are conventionally equipped with valves to permit a periodic dripping of a contained liquid which then flows through the bores 160 and 161 to an outlet 163 at the lower end thereof. This is provided to deposit a thin film of a lubricant, such as kerosene, in advance of the cutting wheel for the purpose of reducing the wear of the cutter wheel as it scores the glass. The film also acts to gather the minute particles of glass formed as the steel edge enters the glass surface and, as it accumulates on the walls of the score line, operates as a parting medium therebetween. This prevents any physical tendency of mutual adherence once this score has been made.

Upon the completion of one traversal of the cutting unit circuitously around the template track 23, the air pressure in the chamber 133 is reduced and the spring 159 operates to raise the plunger 137 and piston 139, attached thereto, and thereby lift the cutter wheel 147 from the glass.

Briefly reviewing use of the cutting apparatus A, the deeply bent and nested pair of glass sheets 15 and 16 are arranged on the supports 21 and 22 so that the marks $h$ placed thereon are aligned with the lines 49 on the gage plates 48 thereby properly locating the central areas of the sheets and with the template track 23. The valve 47 in vacuum line 46 is then operated to reduce the atmospheric pressure within cups 44 to cause them to positively engage the under surface of the lower sheet 16. This will effectively secure the sheets in their position for scoring.

Air under pressure is now admitted from the valve 157 to the chamber 133 through hose 154 to move the piston 139 downwardly, against the bias of spring 159, and lower the cutter wheel 147 into operative scoring position on the uppermost glass surface. The handle 117 is then engaged to manually propel the cutting unit 24 bodily around the track 23. As the unit is thus moved, it will be supported on the pairs of rollers 54 and 55 and as it enters and passes through the critically curved areas of the template and simultaneously turns to follow the pattern outline, the contact of the pairs of rollers 55 will be in the nature of a continuous "point" or line contact since in following the template the force of the turning action will be directed to and borne by the rollers 55 to a greater degree than by the opposed pair of rollers 54. This will reduce, if not eliminate, wearing of the track surface which might otherwise be produced by the corners of the rollers' peripheries.

Also in passing through particularly the sharply upwardly curved areas of the template, some displacement of the pairs of rollers 54 to 57, inclusive, may be encountered. This is compensated for by the means of supporting the pairs of rollers 56 and 57, which, as previously described, are flexingly supported by the springs 82 and 89. These springs operate to compress slightly when any displacement of the rollers occurs but, at the same time, the bias of the springs collectively acts to force the pairs of rollers 57 and 56 upwardly against the under surface of the template and consequently the pairs of rollers 54 and 55 downwardly on the upper surface. While the unit is bodily so supported on the track surface, it is also caused to follow the contour of the track by means of the roller 90 and a pair of rollers 91. The rollers 90 are spring-biased against one edge of the track 23 by springs 104 and 105 and again when the contour or curvature of the track changes, there is provided means for maintaining the unit so that its path of movement conforms to the pattern outline. When the unit is returned to its starting point; the valve 157 is closed, the air pressure is reduced and the cutting wheel raised from the glass by the spring 159.

One preferred method of cutting a pair of bent sheets, as carried out on a cutting apparatus, constructed in accordance with this invention, is to position the cutting unit 24 on the track 23 directly opposite the position shown in Fig. 6 wherein said unit as shown is disposed on what may be termed the "operator's side." The pair of sheets are then loaded onto the apparatus from the "operator's side" and the first scoring operation is carried out. After the spring 159 has raised the wheel 147, the unit is run about the track 23 to a position as shown in full line. The top sheet 15 is now unloaded from the opposite side of the apparatus to remove the outer marginal portions from the sheet and produce a pattern-cut sheet such as 17, and the scoring operation is repeated on the lower sheet.

Upon completion of scoring of the second or lower sheet 16, the valve 47 is closed and the vacuous condition in cups 44 is dissipated. The sheet 16 is removed from the supports 21 and 22 and the unit is moved again half way around the track 23 before subsequently loading a second pair of sheets thereon. Obviously this method of cutting may be reversed in so far as the loading and unloading of the sheets is concerned; however, as herein set forth, the efficiency of this practical use has been well illustrated.

When a pair of bent nested block size sheets are properly located on a cutting apparatus, such as is herein disclosed, it is apparent that two pattern-cut sheets will be obtained therefrom which are in all respects duplicates of one another.

It is to be understood that the form of the invention herewith shown and described is to be taken as a preferred embodiment of the same, but that various changes in the shape, size and arrangement of parts may be resorted to without departing from the spirit of the invention or the scope of the subjoined claim.

We claim:

In apparatus for cutting predetermined shapes from nested glass sheets that have been bent in pairs, the combination with a generally horizontal open support for bent glass sheets, means within the open area of said support for maintaining said sheets in position thereon, and a track-template for determining the shape to be cut mounted in surrounding relation to said support; of a generally C shaped cutter frame having elongated legs, a cutter carriage carried at the end of the lower leg of said frame, means mounting said carriage on said track-template for movement therealong, said means comprising a pair of rollers fixedly mounted in said carriage for rolling engagement with the upper surface of said track-template at one side thereof, a second pair of rollers fixedly mounted in said carriage for rolling engagement with the upper surface of said track-template at the opposite side thereof, a set of four rollers mounted on said carriage for independent movement toward and away from the lower surface of said track-template at locations opposed to the rollers of said first and second named pairs, means for resiliently urging each of the rollers of said set independently toward said track-template, a single roller mounted in said carriage for rolling engagement with the inside edge of said track-template, and a pair of rollers mounted in said carriage for movement independently of each other toward and away from the outer edge of said track pattern at points generally opposed to and substantially equidistant from said single roller, means for resiliently urging each of the rollers of said last-mentioned pair of rollers toward said track-template, means for resiliently urging both of the rollers of said last-mentioned pair as a unit toward said track-template, and a cutting unit carried at the end of the upper leg of said frame and including a cutting tool mounted for movement into engagement with the upper surface of a bent glass sheet on said support during movement of the carriage along the track-template.

References Cited in the file of this patent

UNITED STATES PATENTS

| | | |
|---|---|---|
| 1,038,486 | Brand | Sept. 10, 1912 |
| 1,259,687 | Waterloo | Mar. 19, 1918 |
| 1,930,582 | Burdett et al. | Oct. 17, 1933 |
| 1,996,386 | Owen | Apr. 2, 1935 |
| 1,999,594 | Owen | Apr. 30, 1935 |
| 2,045,586 | Crowley | June 30, 1936 |
| 2,137,112 | Harrington | Nov. 15, 1938 |
| 2,156,864 | Owen | May 2, 1939 |
| 2,357,206 | Klages | Aug. 29, 1944 |
| 2,595,402 | Morris | May 6, 1952 |